T. Bailey,
Washing Machine,
N° 34,870. Patented Apr. 8, 1862.
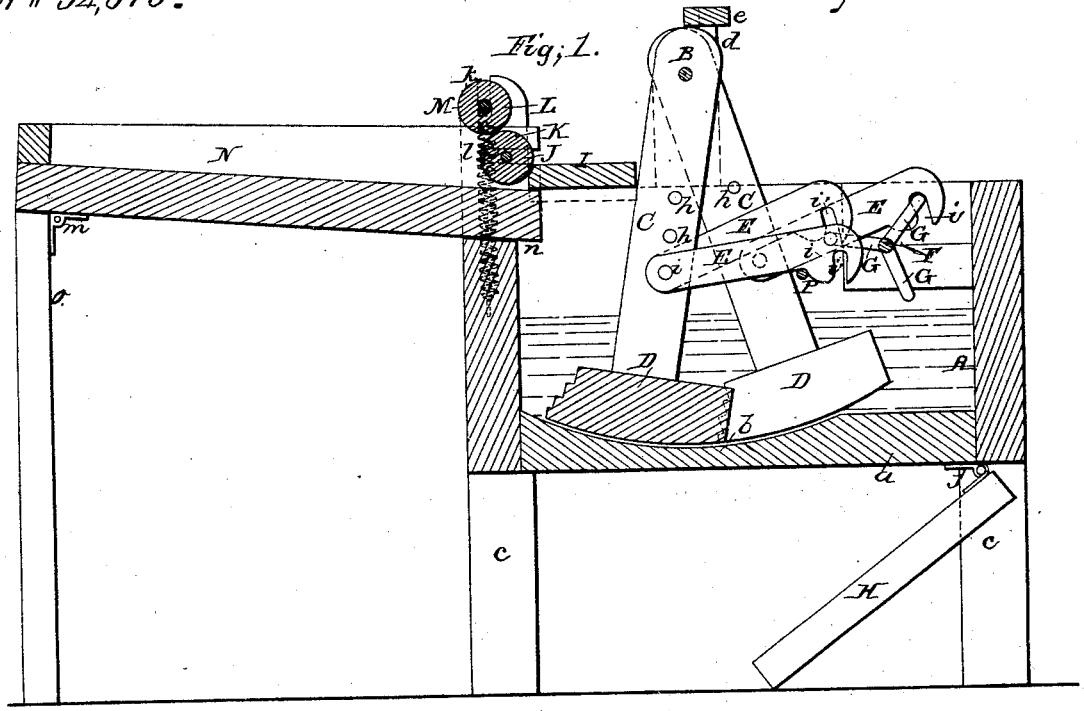
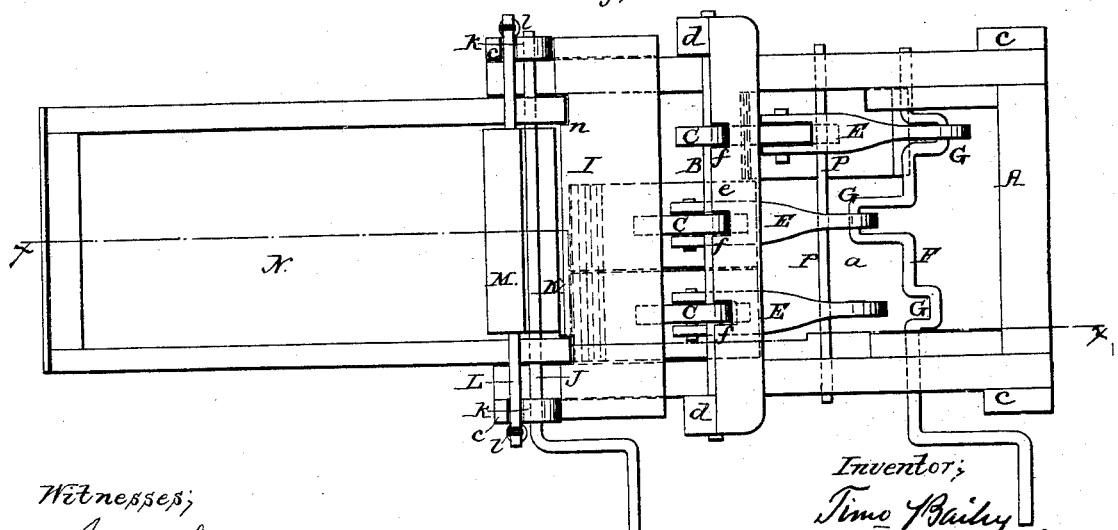
Witnesses;
J. W. Coombs.
Geo. Reed.
Inventor;
Timo. Bailey
per Munn & Co.
Attorneys

UNITED STATES PATENT OFFICE.

TIMOTHY BAILEY, OF BALLSTON SPA, NEW YORK.

IMPROVED WASHING-MACHINE.

Specification forming part of Letters Patent No. 34,870, dated April 8, 1862.

*To all whom it may concern:*

Be it known that I, TIMOTHY BAILEY, of Ballston Spa, in the county of Saratoga and State of New York, have invented a new and Improved Clothes Washing and Wringing Machine; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a plan or top view of the same.

Similar letters of reference indicate corresponding parts in the two figures.

To enable those skilled in the art to fully understand and construct my invention I will proceed to describe it.

A is a box of any proper dimensions of quadrilateral form, and provided with a bottom $a$, having a concave upper surface $b$, as shown clearly in Fig. 1. The box A is supported at a suitable height by uprights or legs $c$, two at each end, and there is an upright $d$ attached to each side of the box near its center, said uprights being connected at their upper ends by a cross-bar $e$.

B is a rod, which passes through the uprights $d\ d$ near their upper ends, and on this rod there are placed loosely a series of pendants C. Three are shown in Fig. 2, but more or less may be used. These pendants are kept in proper position on the rod B by having their upper ends fitted in slots $f$ in the cross-bar $e$, and to the lower end of each pendant C there is attached a beater D. The front edges of these beaters are notched or cut horizontally to form step-like projections $g$, as shown in Fig. 1, and the bottoms of the beaters are rounded to conform to the concave surface of the bottom $a$ of the box A.

The pendants C are each perforated with a series of holes $h$, one above the other, as shown in Fig. 1, and to each pendant there is attached an arm E by means of a pin $i$, said pin passing through any of the holes $h$ in its pendant. The outer end of each arm E is notched to form a hook $i'$. (See Fig. 1.)

F is a shaft, which is fitted horizontally in the box A, and is provided with three cranks G G G, which are placed at obtuse angles with each other, a crank being in line with each of the arms E.

At the front end of the box A, and to its under side at its center, there is attached by a hinge or joint $j$ a leg or prop H. This leg or prop is longer than the portion of the uprights or legs $c$ below the box A, and when it is adjusted in an upright position it will cause the box A to have an inclined position, the front uprights or legs $c$ being raised from the surface of the ground.

I is a board, which is placed loosely on the box A at its back part, directly behind the uprights $d\ d$; and J is a shaft, which passes through the upper parts of the uprights $c\ c$ at the back part of the box A. On this shaft J there is placed a roller K, which may be of wood, india-rubber, or other suitable material, and the upper ends of the uprights $c\ c$ above roller K are slotted vertically, as shown at $k$, to receive the ends of a shaft L, on which a roller M is placed, which may be of the same material as K. The roller M rests on the roller K, and is made to bear upon it with a greater or less pressure by means of springs $l\ l$.

N is a box or trough, which is provided at its outer end with a leg O, secured to it by a hinge or joint $m$. The inner end of the box or trough N is fitted in the back end of the box A, as shown at $n$ in Fig. 1.

P is a rod on which the arms E rest or bear.

The operation is as follows: The box A is supplied with a requisite quantity of suds, and the clothes to be washed are placed in the box A between the beaters D and the back end of the box, as shown in red in Fig. 1. The crank-shaft F is then turned by hand, and the cranks G successively engage with the hooks $i'$ of the arms E, and draw forward the beaters D, the latter being successively released from the cranks as the shaft F rotates and then falling backward by their own gravity against the clothes. By this arrangement the arms are not connected with the crank-shaft F when the beaters strike the clothes, and hence the perfect operation of the latter will not be in the least affected by the concussions and jars of the beaters; besides the latter will act in a much more efficient manner than they otherwise would.

When it is necessary that the beaters should strike the clothes with considerable force, the front end of the box is raised by adjusting the leg or prop H, vertically or as nearly so as may be. This tilting of the box A favors the strength of the blows of the beaters, as it allows them a greater or more vertical descent, and by thus increasing their force also renders the beaters available as wringers, the suds being drawn from the box previous to the commencement of the wringing process.

The board I serves as a guard and prevents the water splashing out of the box A during the washing process, and when clothes are washed which require great care in wringing, and which might probably be injured by the beaters D, they are passed between the rollers K M and received in the box or trough N. To effect this, the board I is simply removed from the box A and the clothes raised by one hand and entered between the rollers K M, the lower roller K being turned by the other hand.

When the machine is not in use, the box or trough N may be turned up or detached from the box A, the leg or prop O folded underneath it, and the whole stowed away in a small space. The board I also serves as a stop for the pendants C and prevents the beaters D from coming in contact with the back end of the box A.

The device as a whole is extremely simple and efficient, and well adapted for washing and wringing all kinds of clothes.

I do not claim the pressure-rollers K M separately, for they have been previously used; neither do I claim, broadly, the employment or use of beaters, for they also have been used, although, so far as I am aware, arranged differently from the way herein shown and described; but,

Having thus described my invention, what I claim as new, and desire to secure by Letters Patent, is—

The combination of the self-locking and self-unlocking arms E and cranks G with the pendants C and beaters D in the manner and for the purpose herein shown and described.

TIMOTHY BAILEY.

Witnesses:
 DAVID MAXWELL,
 SANFORD SMITH.